May 2, 1967 S. DIX 3,317,106

SOLDER BOAT

Filed Aug. 19, 1963

INVENTOR:
Sydney Dix

By Smyth, Roston & Pavitt
Attorneys

United States Patent Office 3,317,106
Patented May 2, 1967

3,317,106

SOLDER BOAT

Sydney Dix, Costa Mesa, Calif., assignor to Dix Engineering Co., Venice, Calif., a corporation of California Filed Aug. 19, 1963, Ser. No. 302,931
2 Claims. (Cl. 228—44)

The present invention relates to the manufacture of semiconductive devices, and more particularly to means for soldering at least a portion of the semiconductive elements of a diode within a glass package.

In the manufacture of semiconductive devices such as diodes, it is desirable to enclose a semiconductive member inside of a glass capsule to protect it from its environment. In the manufacture of such diodes normally a large number of empty glass capsules having an electrical conductor in one end are mounted on a workpiece holder such as a so-called solder boat whereby the conductor will depend from the lower end of the capsule. A piece of solder or so-called solder preform and a semiconductive wafer are then loaded into each of the glass capsules. The solder boats with the loaded glass capsules are then placed in an oven and heated to a sufficient temperature to melt the solder preform. The solder will thus form a puddle of molten solder at the bottom of the capsule with the semiconductive wafer floating on top of the puddle. The solder boat and glass capsules are then allowed to cool until the solder solidifies whereby the wafer will be soldered onto the conductive lead.

In order to insure that the semiconductive wafer is positively soldered to the electrical lead, it is necessary to apply a suitable force on the wafer that will bias the wafer toward the conductor so as to maintain the solder and wafer in intimate electrical contact with the conductor. Heretofore, it has been customary to apply a bias force by means of a weight which fits into the open end of the capsule so as to seat on top of the wafer and force it downwardly into the puddle of solder. Heretofore, it has been necessary to manually place an individual weight into each of the glass capsules prior to the heating operation and then to manually remove each of the weights from the capsules. This is not only a slow and time consuming manual operation that greatly increases the cost of manufacture of such diodes, but also severely limits the rate at which the diodes can be produced.

It is now proposed to provide means which will overcome the foregoing difficulties. More particularly, it is proposed to provide assembly and soldering means that will permit the rapid soldering of large numbers of diodes with a minimum amount of manual labor. Such assembly and soldering means will not only be effective to increase the reliability of the soldering operation, but will also decrease the cost and increase the rate of production. In one operative embodiment of the present invention, this is accomplished by providing assembly and soldering means that are capable of simultaneously placing a bias weight onto the conductive wafers in a large number of glass and simultaneously removing the weights whereby the inserting and removing of the weights in a large group of diodes can be accomplished by means of single operations.

These and other features and advantages of the present invention will become readily apparent from the following detailed description of one operative embodiment of the present invention particularly when taken in connection with the accompanying drawings wherein like reference numerals refer to like parts, and wherein.

Figures 2, 3:
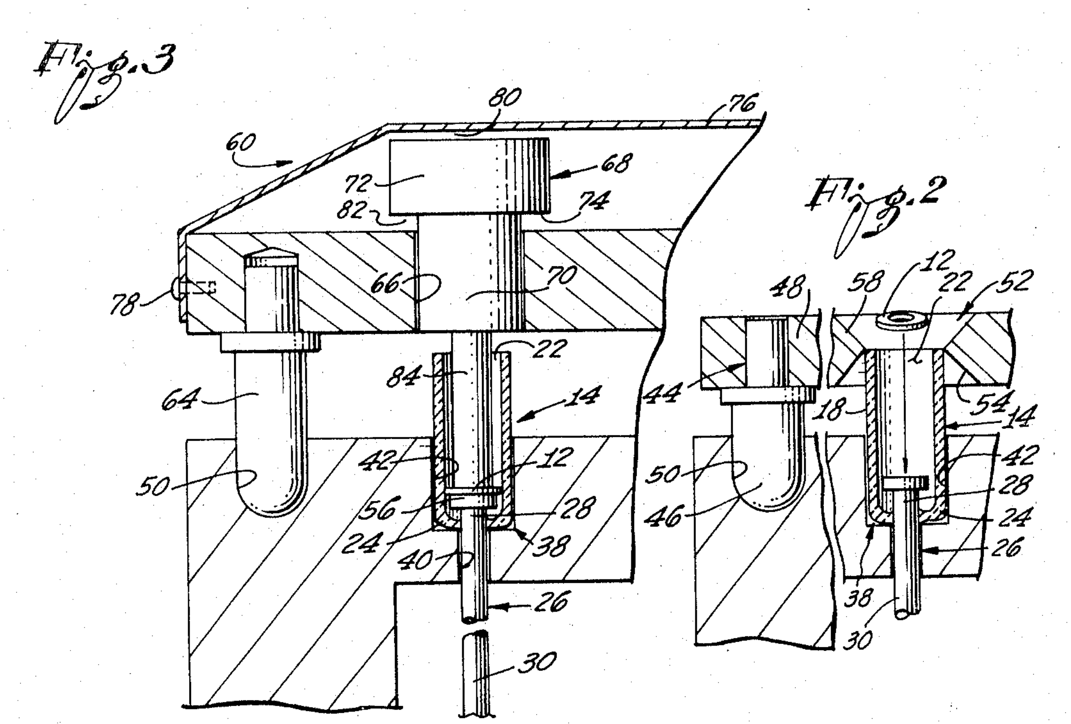
FIGURE 2 is a cross-sectional view of a portion of the assembly and soldering means in another operative condition.
FIGURE 3 is a fragmentary cross-sectional view of a portion of the assembly and soldering means of FIGURE 1.
Figure 1:
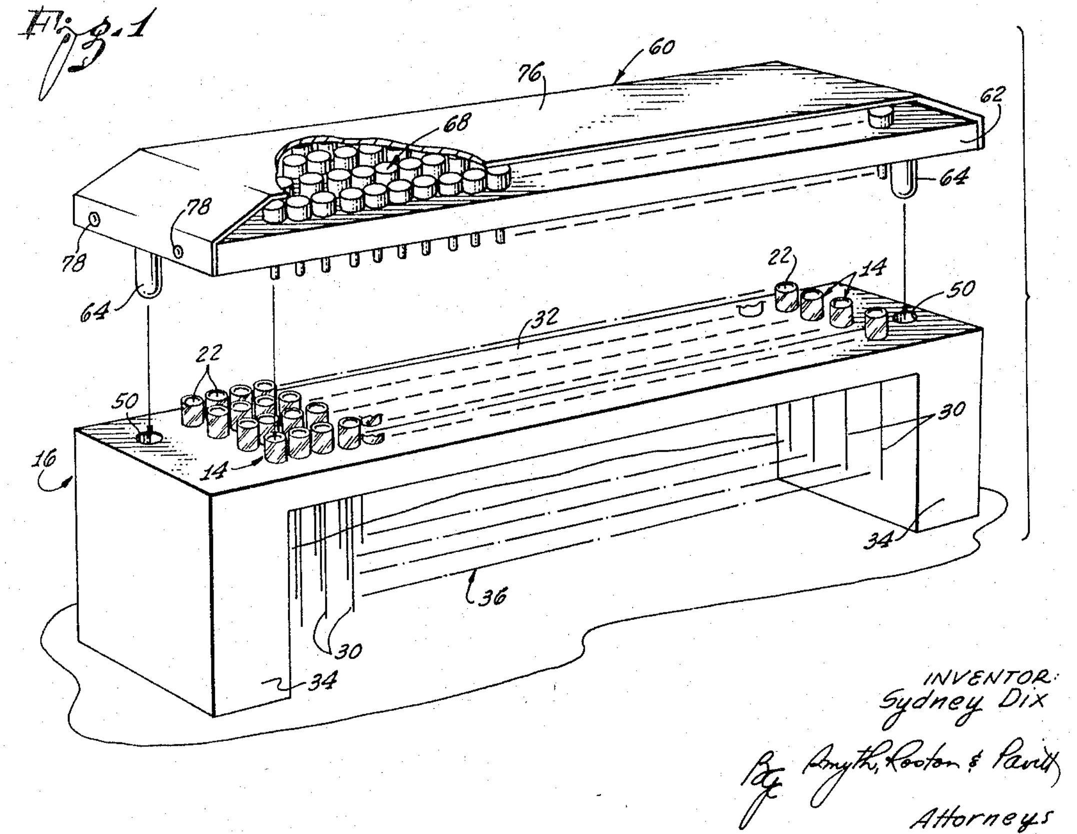
FIGURE 1 is a perspective view of assembly and soldering means embodying one operative form of the present invention and in a first operative condition.

Referring to the drawings in more detail, the present invention is particularly adapted to be embodied in an assembly and soldering means for loading a first series of substantially identical workpieces into a second series of substantially identical workpieces and to secure the workpieces in position. Although this means may be adapted for use with workpieces of a wide variety of sizes and kinds, in the present instance it is particularly adapted for loading a small piece such as a semiconductive wafer 12 into a glass capsule 14 such as used in the manufacture of glass encapsulated diodes and to solder the wafer 12 in position inside of the capsule 14.

Normally in the manufacture of glass encapsulated diodes initially a large number of empty glass capsules 14 are mounted on a suitable workpiece holder or a so-called solder boat 16. The glass capsules 14 are of a substantially standard design and are readily available in the industry. Normally, they are received in bulk form from the manufacturer. Each of the glass capsules 14 includes a small section of glass tubing 18.

One end 22 of the glass tube 18 is open to permit ready access into the interior of the tube 18. The opposite end 24 of the capsule 14 is fused around an electrical lead or conductor 26 to form an hermetic seal. The inner end 28 of the conductor 26 extends a small distance into the interior of the capsule 14. The remaining portion 30 of the conductor 26 extends outwardly from the exterior of the capsule 14. This portion 30 of the conductor 26 forms an electrical lead for electrically interconnecting one side of the diode with any desired electrical component.

As previously stated, these capsules 14 are normally received from the manufacture in bulk. As a consequence, one of the first steps in the manufacutre of the diodes is to load the various capsules 14 onto a workpiece holder such as the so-called solder boat 16. This loading operation may be accomplished by means of a loading machine such as disclosed and claimed in copending application Serial No. 303,015 entitled "Loading Machine" filed August 19, 1963, and assigned of record to Dix Engineering Co., or it may be accomplished by manually positioning each of the capsules 14 on the workpiece holder or solder boat 16.

The workpiece holder or solder boat 16 may be of any conventional design. However, in any given assembly line, the holders or solder boats 16 will normally be of a standard or uniform design. By way of example, the solder boat 16 may include a center section 32 having a substantially plain surface on the top thereof and a pair of legs 34 on the opposite ends of the section 32. The legs 34 will be effective to support the solder boat 16 with the center section 32 spaced above the surface upon which the legs 34 rest. This will insure a clearance space 36 of substantial size below the center section 32.

The center section 32 of the boat may include a plurality of capsule receiving means. By way of example, these means may include a plurality of passages 38 that extend completely through the center section 32. Each of the passages 38 may be drilled through the center section 32 and include a smaller portion 40 having an inside diameter that is just large enough to permit the conductive lead 26 to fit freely therethrough. Thus, a capsule may be seated on the center section 32 with the lead 26 extending downwardly into the clearance space 36 therebelow.

In addition, each passage 38 may include a larger section 42. The larger section 42 is counterbored in substantial alignment with the smaller portion 40. The inside diameters of the larger portions 42 are preferably only slightly greater than the outside diameters of the glass tubing 18 so as to allow the capsules 14 to just fit into the larger portion 42 and seat on its lower end. As will become apparent, it is desirable that the clearance space around the tubing 18 be sufficiently small to insure the capsules 14 being retained as nearly vertical as possible.

Although the passages 38 may be arranged in any desired configuration, it is preferable that the capsules 14 on all of the solder boats 16 be arranged in a predetermined standard pattern having a substantially uniform spacing therebetween. By way of example, the present solder boat 16 has the passages 38 arranged in four parallel rows extending lengthwise of the boat 16 with each row containing twenty-five passages. It will thus be seen that a total of one hundred capsules 14 may be loaded onto the center section 32 of a boat 16 at one time. All of these capsules 14 will be accurately retained in a predetermined fixed relationship relative to each other.

After the glass capsules 14 have all been properly seated in the passages 38, they will normally be very accurately positioned. All of the capsules 14 will be in substantially vertical positions with the ends 22 of the glass tubes 18 all located in regular pattern. However, under some circumstances, one or more of the capsules 14 may be mispositioned as a result of the capsule 14 not seating properly in the passage 38, or its being slightly "cocked" in its passage 38. If the amount of error is very large, it may result in interfering with subsequent assembly operations. In order to overcome this difficulty, an alignment guide 44 may be provided. Such a guide 44 may consist of a relatively thin plate 48 that has a size and shape that is substantially identical to the size and shape of the top of the solder boat 16. One or more reference pins 46 may be provided on the plate 48 so as to project downwardly therefrom. A corresponding number of complimentary reference sockets 50 may be provided in the top of the solder boat 16 for receiving the pins 46 and retaining the guide 44 in position. By precisely locating the sockets 50 and pins 46 in standard or reference locations on all of the solder boats 16 and guides 44, the guides 44 will always be accurately positioned on the boats 16.

A plurality of alignment apertures 52 may be disposed in the guide 44 in the same pattern as the passages 38 in the solder boat 16 so as to be coaxial therewith. Thus, the apertures 52 will be positioned so that when the reference pins 46 are seated in the reference sockets 50, each of the apertures 52 will be in alignment with the open end 22 of one of the capsules 14. In order to insure that the ends 22 of the capsules 14 will easily fit into the apertures 52 even if they are slightly misaligned, the lower sides of the apertures may be chamfered or tapered 54. Thus, when the guide 44 is placed on the solder boat 16, if any of the capsules 14 are tilted or otherwise out of position, the open end 22 of the capsule 14 will be forced into the exact location defined by the aperture 52.

After a group of the capsules 14 have been loaded onto the solder boat 16 by hand or by means of a loading machine such as disclosed and claimed in copending application Serial No. 303,015 and the alignment guide 44 has been positioned thereon, a so-called solder preform 56 may be loaded into each of the capsules. A solder preform 56 is a small pellet or disc of solder which fits in the bottom of the capsule 14 in intimate contact with the end 28 of the electrical conductor 26. When the capsule 14 is heated above the melting point of the solder, the solder will melt and form a puddle of liquid solder. The solder will flow around the short end 28 of the conductor 26 and remain in intimate electrical contact therewith. Thus, when the solder cools and solidifies, it may be effective to have soldered a semiconductor wafer 12 to the end 28 of the conductor 26.

In order to facilitate the loading of the solder preforms 56 or other elements such as semiconductive wafers 12 into the glass capsules 14, the upper sides of the alignment apertures 52 may be chamfered or tapered to provide enlarged, inwardly sloping surfaces 58. This will increase the area onto which the solder preforms 56 may fall and still fall into the glass capsules 14.

The solder preforms 56 may be individually loaded by hand into each of the capsules 14 or they may be loaded by means of a loading machine such as disclosed and claimed in copending application Ser. No. 317,255 entitled, "Loading Machine," filed Oct. 18, 1963, and assigned of record to Dix Engineering Co. In such a loading machine, a plurality of punches simultaneously punch the solder preforms 56 from a flat blank of solder and cause the resultant preforms 56 to all drop into each of the glass capsules 14 so as to rest on the ends 28 of the conductors 26.

After a solder preform 56 has been placed in each and every capsule 14 on the boat 16, a semiconductive device such as a silicon wafer 12 may be inserted into each of the glass capsules. The wafers 12 may drop onto the tapered surface 58 and/or the open end 22 of the capsule 14 and fall to the bottoms 24 of the capsules 14. The wafers 12 will then rest on top of the solder preforms 56.

After a solder prefrom 56 and a semiconductive wafer 12 have been placed in each of the glass capsules 14, the alignment guide 44 may be carefully removed from the solder boat 16 so as not to disturb the vertical positions or alignments of the various glass capsules 14 whereby the wafers 12 may be soldered onto the ends 28 of the conductors 26.

In order to insure that the wafers 12 are positively soldered onto the electrical leads 26, it is desirable that they be maintained in intimate contact with the conductor 26 and/or the solder during the soldering operation. This may be accomplished by applying a small biasing force that is directed axially downwardly through the capsule 14 and against the wafer 12 so as to retain it positioned on the solder preform 56.

In the present instance, the force is provided by means of a weight plate 60 that is adapted to fit on top of the solder boat 16 during the soldering operation. The weight plate 60 includes a flat support plate 62 similar to the plate 48 in the alignment guide 44. The plate 62 consists of a metal that is capable of withstanding the high temperatures required during a soldering operation and has a rectangular shape corresponding to the shape of the solder boat 16.

One or more reference pins 64 may be provided on the plate 62. These pins 64 correspond to the reference pins 46 in the alignment guide 44 and are adapted to fit into the reference sockets 50 on the solder boat 16. This will insure that the weight plate 60 is accurately mounted and positioned on the solder boat 16 in the same manner as the alignment guide 44.

The support plate 62 includes a separate opening 66 for each of the passages 38 that extend through the center section 32 for receiving the glass capsules 14. The openings 66 are positioned in the same configuration and spacing as the passages 38. Thus, when the reference pins 64 fit into the reference sockets 50, the openings 66 will be in exact axial alignment with the passages 38 and the glass capsules 14 sealed therein.

A separate and independent weight member 68 is provided for each of the openings 66. All of the weights 68 are substantially identical. More particularly, each of the weights 68 includes a substantially cylindrical barrel 70. The outside diameter of the barrel 70 is slightly smaller than the inside of the opening 66 whereby the weight 68 may freely slide through the opening 66. However, the clearance space should be small enough to prevent the weight 68 becoming axially misaligned.

An enlarged head 72 having a diameter greater than the diameter of the opening 66 may be provided on the upper end of the barrel 70 so as to form an annular shoulder 74. This shoulder 74 will be effective to mate with and rest on the top of the plate 62 and thereby prevent the weight 68 passing downwardly through the opening 66.

In addition, a thin sheet metal cover 76 may extend lengthwise of the plate 62. The cover 76 is secured to the ends of the plate 62 by rivets 78 or other suitable fastening means so as to provide small clearance spaces 80 above each of the heads 72. It may thus be seen that the weights 68 will be free to slide axially of the openings 66 within the limits of the clearance spaces 80 and 82 between the cover 76 and the head 72.

A thin elongated probe 84 may be provided on the lower end of each of the barrels 70 so as to project downwardly beyond the bottom of the plate 62. Each of the probes 84 has an outside diameter that is slightly less than the inside diameters of the capsules 14. As a consequence, the probes 84 may be easily inserted into the interior of the glass tube 18. The probe 84 is sufficiently long enough to insure a positive engagement between its lower end 86 and the silicon wafer 12 when the reference pins 64 are seated in the reference sockets 50. However, the probes 84 are sufficiently short to prevent the heads 72 of the weights 68 being lifted far enough from the plate 62 to strike the inside of the cover 76.

It may thus be seen that each of the weights 64 will be slightly raised so that the head 70 will no longer seat on the plate 62. Instead, the entire mass of the weight 68 will be supported by the wafer 12 and solder preform 56 in the bottom 24 of the glass capsule 14. The amount of this mass is preferably sufficiently large to insure the force the probe 84 exerts against the wafer 12 and solder preform 56 being effective to maintain them all in intimate contact with each other and the electrical conductor 26 at all times. However, the force exerted upon the semiconductive wafer 12 should not be large enough to in any way damage the wafer 12.

In order to employ the present invention for soldering a silicon wafer 12 to the electrical conductor 26 in a glass capsule 14, a group of the capsules 14 are first placed on a solder boat 16. Each of the capsules 14 are then loaded with a solder preform 56 and a semiconductive wafer 12. A weight plate 60 is then positioned over the top of the solder boat 16 and gently lowered into position so that the reference pins 64 fit into the reference sockets 50. When the pins 64 are seated in the sockets 50, the weight of the plate 62 and cover 76 will be fully supported by the pins 64. During the foregoing step, all of the probes 84 on the weights 68 will have simultaneously been positioned in the interiors of the glass capsules 14. However, the lower ends 86 of the probes 84 will engage the wafers 12 before the pins 64 are fully seated. As a consequence, each of the individual weights 64 will assume an elevated position with the heads 72 slightly raised from the plate 62. The weights 68 will thus be supported by the ends 86 of the probes 84 resting on the wafers 12. If each of the weights 68 has a standard mass, the magnitude of the bias force applied to the wafers 12 will be a standard and constant amount.

After the weight plate 60 has been placed on the solder boat 16, the assembly may then be placed in a suitable oven and heated until the solder preforms 56 melt. When they become liquid, they will flow to the bottom 24 of the capsules 14 and form molten puddles around the ends 28 of the conductors 26. Normally, the wafer 12 will float on top of this puddle. Even though the wafers 12 and solder may individually settle downwardly around the lower ends 24 of the capsules 14, each of the weights 68 may also individually descend into the glass capsule 14. As a result, the wafers 12 will always be biased by a constant force and maintained in intimate contact with the solder. After the solder preforms 56 in all of the capsules 14 have melted, the solder boat 16 and capsules 14 may be allowed to cool to room temperature whereby the solder will solidify and thereby solder the wafers 12 to the ends 28 of leads 26. The weight plate 60 may then be removed from the solder boat 16 whereby the capsules 14 with the wafers 12 soldered therein may be subjected to final steps in the assembly process.

It may thus be seen that a new and novel weight plate 60 has been provided with which will be effective to permit placing a suitable biasing weight in each of the glass capsules 14 by means of a single and simple manual operation which may be performed in a relatively short time. Also, after the soldering operation has been completed, the weight plate 60 may be easily removed with a single operation ready for a repeated soldering operation.

While only a single embodiment of the present invention has been disclosed and described herein, it will be readily apparent to persons skilled in the art that numerous changes and modifications may be made without departing from the spirit of the invention. For example, the structure of the weight plate 60 may be modified to correspond to the solder boat 16 and the capsules 14. Also, the structure of the weights 68 and probe 84 may be modified as desired or suitable spring biasing means may be substituted for the weights in order to produce the required biasing forces. Accordingly, the foregoing disclosure and description thereof are for illustrative purposes only and do not in any way limit the invention which is defined only by the claims which follow.

What is claimed is:

1. Means for soldering semiconductive wafers to the electrical conductors in a plurality of capsules, said means comprising the combination of:

a workpiece holder, capsule receiving means on said holder arranged in a predetermined pattern, said receiving means receiving said capsules and retaining said capsules positioned therein with said open ends being exposed and arranged in said pattern, a rigid support member, complementary mounting means on said support means and said workpiece holder for positioning and detachably mounting said support member in a predetermined reference position relative to said workpiece holder, said mounting means supporting the weight of said support member, and a plurality of biasing means secured to said support member and carried thereby, said biasing means arranged in said pattern and positioned to register with the capsules disposed on said receiving means, each of said biasing means including a portion constructed and arranged for fitting inside of one of said capsules and for engaging the semiconductive wafer disposed in said capsules, each of said biasing means independent of the others of said biasing means and the weight of said support member applying a predetermined biasing force on its respective wafer for biasing said wafer toward the conductor in said capsule.

2. Means for soldering semiconductive wafers to the electrical conductor in a plurality of open ended capsules, said means comprising the combination of:

a workpiece holder, at least two reference sockets positioned on said workpiece holder in predetermined locations, capsule receiving means on said holder arranged in a predetermined pattern, said receiving means receiving said capsules and retaining them in vertical positions with said open ends being directed upwardly and arranged in said pattern, a support plate, at least two reference pins on said plate positioned to fit into said reference sockets on said workpiece holder for maintaining said plate in a predetermined reference position with respect to said workpiece holder, said reference pins when seated in said sockets supporting the weight of said plate, a plurality of openings in said plate, said openings arranged in said pattern and positioned in axial alignment with the open ends of the capsules on said receiving means when said reference pins are seated in said recesses, a weight slidably disposed in each of said passages, each of said weights independent of the other weights being free to move axially of said passages within predetermined ranges, and a probe on the lower end of each of said weights, said probe having a diameter that is less than the inside diameter of the open ends of said capsules, said probe fitting into the interior of said capsules and resting on the wafers in said capsules for supporting the mass of said weights and biasing said wafers toward said conductors for being soldered thereto.

References Cited by the Examiner

UNITED STATES PATENTS

| | | | |
|---|---|---|---|
| 2,496,950 | 2/1950 | Marcus et al. | 219—85 |
| 2,813,191 | 11/1957 | Gray | 219—85 |

JOHN F. CAMPBELL, *Primary Examiner.*

WHITMORE A. WILTZ, CHARLIE T. MOON, *Examiners.*

M. L. FAIGUS, *Assistant Examiner.*